No. 660,356. Patented Oct. 23, 1900.
C. H. BAKER.
WATER GATE.
(Application filed June 14, 1900.)
(No Model.)

Witnesses,
E. A. Brandau

Inventor
Charles H. Baker
By Dewey Strong & Co.
Attys

UNITED STATES PATENT OFFICE.

CHARLES H. BAKER, OF TOPIA, MEXICO.

WATER-GATE.

SPECIFICATION forming part of Letters Patent No. 660,356, dated October 23, 1900.

Application filed June 14, 1900. Serial No. 20,223. (No model.)

*To all whom it may concern:*

Be it known that I, CHARLES H. BAKER, a citizen of the United States, residing at Topia, Durango, Mexico, have invented an Improvement in Water-Gates; and I hereby declare the following to be a full, clear, and exact description of the same.

My invention relates to an improvement in that class of gates which are designed to control the flow of water in pipes.

It consists of a removable seat, with means for attaching it to the chamber, guides by which the gate is guided in its movements, and adjustments for the guides to retain the gate in contact with its seat after the latter has been dressed down and its plane changed.

It also comprises a sediment-chamber, with means for discharging it from time to time, so as to leave a clear space at all times for the movement of the gate, and details of construction which will be more fully explained by reference to the accompanying drawings, in which—

Figure 1:
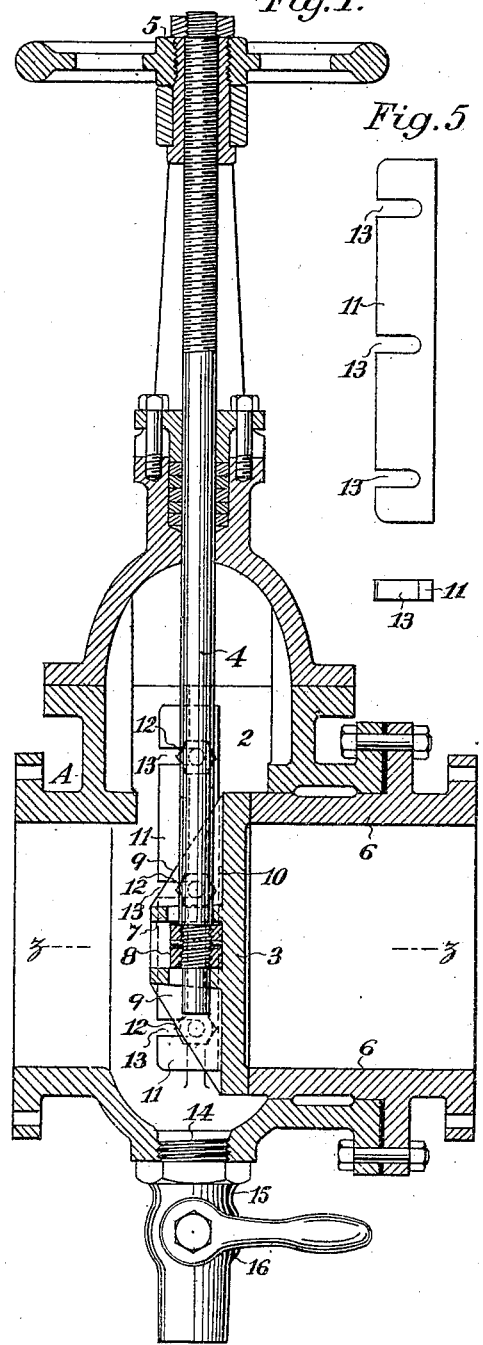
Figures 2, 5:
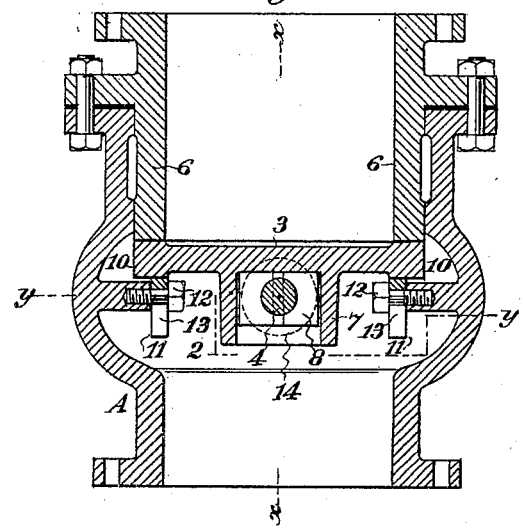
Figure 3:
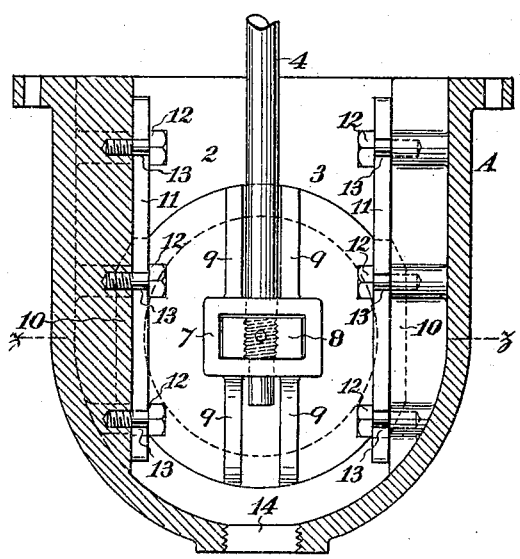
Figure 4:
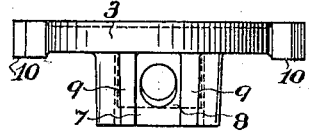

Figure 1 is a longitudinal section on the line $x\, x$ of Fig. 2. Fig. 2 is a horizontal section on the line $z\, z$ of Figs. 1 and 3. Fig. 3 is a transverse section on the line $y\, y$. Fig. 4 is a plan of the valve 3. Fig. 5 is a side elevation and plan of the guides.

Water-gates are fitted to move in chambers transverse to the line of pipe through which the water is flowing, and the face of the gate is made to fit against a ground or otherwise fitted plane surface sufficiently tight to prevent the passage of the water when the gate is closed. The joint is usually formed by means of a wedge-shaped or inclined surface which provides a pressure to hold the gate firmly against the seat. Experience shows that the flow of water, especially that which is heavily charged with sediment of any kind, soon wears out the gate or seat and makes the joint leaky.

It is the object of my invention to provide means for removing the seat, so that it can be redressed and a new surface formed when it is worn out, which operation cannot be performed in the ordinary construction of gates.

I have here illustrated one form of water-gate to which my invention is applied. As shown, A is a section having the transversely-arranged valve-chamber 2, and this section is provided with flanges by which connection can be made with the pipe through which the water flows, and when thus connected the gate 3 may be moved up or down by means of a shaft 4, the upper end of which is screw-threaded, and its threads are engaged by a nut 5, having a hand-wheel or other device by which it may be turned, so as to follow the threads on the gate-stem, and thus raise or depress the latter. The seat or face against which the gate closes is here shown as formed upon the end of a sleeve or section 6, which is slidable into the gate-section A, and it is provided with flanges or bolts, so that it can be interposed between the gate-section and the next adjacent section of the conducting-pipe upon that side. This section 6 is fitted water-tight, and its inner end projects into the valve-chamber 2, so as to be in line with the valve-face, which can be thus closed against it. The valve-stem 4 is connected with the gate by means of a hollow housing or chamber 7, which projects from the back of the valve and has a vertical hole made into the top through which the valve-stem passes. The lower end of the stem is threaded and is adapted to fit the threads of a nut 8, which is contained within the hollow housing, so that when the valve-stem has been securely locked with said nut it is in condition to raise or lower the valve by the turning of the hand-wheel at the upper end. Angular plates or braces 9 are cast or formed upon the back of the valve, extending from its periphery to the housing 7 and forming braces therefor.

In order to guide the valve in its movements, I have shown it formed with vertical slides upon its opposite sides, as shown at 10, and these slides are adapted to travel against the guides 11. These guides are fixed in place by nuts and supporting-bolts, as at 12, and the guides have slots 13 extending horizontally outward from the bolt-holes, so that the slides may be moved by loosening the nuts. The object of this is to allow for adjustments of the valve-seat, which may take place from time to time by reason of its being dressed down after it has become worn and leaky. When this is done, the end of the seat-section 6 will have been removed a slight distance from the previous line of travel of the valve, and in order to bring the valve again into contact with this seat it is necessary to move it a distance corresponding with the amount which has been dressed off from the seat. These guides 11 allow of this adjustment by simply loosening the nuts and moving the guides forward until they press against the slide-surfaces 10 of the valve, while the face of the valve travels in contact with its seat. The valve-stem may pass through an oval slot or opening in the top of the housing 7, so that by loosening the nut 8 the valve can be moved toward the seat, while the valve-stem moving in the slot will retain its line of travel and not be thrown out of adjustment by the movement of the valve.

In devices of this character it is often difficult to close the gate by reason of sediment collecting in the lower part of the valve-chamber. As shown in my invention, the valve-chamber has a concave depression 14 made in the lower part, and this has a screw-threaded nipple into which a discharge-pipe 15 is screwed. This discharge-pipe has a cock or valve, as at 16, and any sediment which is deposited at this point will fall into the depression and the pipe may be discharged from time to time by opening the cock.

By this construction of the valve-seat it is easy at any time to remove it from the gate-section, dress off the seat, and return it to its place without disturbing anything beyond the adjacent parts of the apparatus.

Having thus described my invention, what I claim as new, and desire to secure by Letters Patent, is—

1. The combination of a water-gate having a chamber and a valve-seat therein, of a valve to engage said seat, and guides for the valve said guides adjustable to compensate for wear of the face of the valve.

2. The combination in a water-gate, of a gate-chamber, a section formed therewith adapted to connect with the adjacent pipe-line, an independent seat-section, with means for securing it to the gate-section, with its inner end forming a seat against which the gate is closable, vertical guides adjustably fixed in line with the back of the gate, and slide-surfaces formed upon the gate to travel against the guides.

3. The combination in a water-gate of a chamber, a section formed therewith adapted to be interposed in the line of the conducting-pipe, an independent removable section fitting into the gate-section having its inner end adapted to form a seat for the gate, a gate having vertical slide-surfaces formed upon its opposite edges, guides against which the gate is slidable, said guides having horizontal slots and securing bolts and nuts whereby they may be advanced to maintain the gate in contact with the seat.

4. The combination in a water-gate of a chamber, a section formed therewith, and means for securing it in the line of conducting-pipe, an independent seat-section, a means for removably securing it to the gate-section, a box or housing formed on the back of the gate having a slotted opening for the reception of the valve-stem, and a nut by which the latter is adjustably secured to the gate to allow the latter to be advanced transversely, vertical slide-surfaces formed upon the back of the gate, transversely-adjustable guides over which said slide-surfaces are movable in the opening and closing of the gate.

5. The combination in a water-gate of a chamber, a section formed therewith adapted to be interposed in the conducting-pipe, a supplemental removable seat-section fitting one end of the gate-section, a valve and means whereby it is movable transversely over the end of the seat-section to open and close, adjustable guides for the valve to compensate for the wear of the valve-face, and a depression made in the lower part of the gate-chamber for the reception of sediment and a pipe and discharge-cock in line therewith.

In witness whereof I have hereunto set my hand.

CHARLES H. BAKER.

Witnesses:
S. H. NOURSE,
JESSIE C. BRODIE.